United States Patent [19]

Kainulainen et al.

[11] Patent Number: 4,539,241
[45] Date of Patent: Sep. 3, 1985

[54] PROCEDURE FOR MANUFACTURING A BUILDING ELEMENT, AND THE BUILDING ELEMENT

[76] Inventors: Raimo Kainulainen; Antti Sipponen, both of Mastotie 10, 17300 Vääksy; Tuomo Toivola, Mäyräntie 2 as. 9, 49210 Huutjärvi, all of Finland

[21] Appl. No.: 357,881

[22] Filed: Mar. 15, 1982

[30] Foreign Application Priority Data

| Mar. 17, 1981 [FI] | Finland | 810827 |
| Mar. 17, 1981 [FI] | Finland | 810828 |
| Feb. 5, 1982 [FI] | Finland | 820373 |

[51] Int. Cl.³ .............................. B32B 3/12
[52] U.S. Cl. .................. 428/71; 52/309.11; 52/455; 156/79; 156/299; 264/46.5; 428/76; 428/137; 428/160
[58] Field of Search .................. 52/309.9, 309.11, 455; 156/79, 299; 264/46.5; 428/137, 71, 160, 76

[56] References Cited

U.S. PATENT DOCUMENTS

| 3,546,038 | 12/1970 | Smith | 156/322 X |
| 3,560,285 | 2/1971 | Schroter et al. | 156/79 |
| 4,072,548 | 2/1978 | Gerson et al. | 156/79 |
| 4,284,447 | 8/1981 | Dickens et al. | 156/299 X |
| 4,349,495 | 9/1982 | Muttle | 264/46.5 X |

*Primary Examiner*—Robert A. Dawson
*Attorney, Agent, or Firm*—Martin Smolowitz

[57] ABSTRACT

A procedure for manufacturing a building element, such as a door, wherein the surface sheets of the element are affixed to a frame and between the sheets is placed an insulation. The insulation consists of polyurethane, which is injected into the interspace of the surface sheets so that it becomes glued fast to the sheets and to the frame. By the aid of the invention a rigid, tightly sealed and light weight building element is obtained. In another embodiment, at least one surface sheet is provided with apertures which are each covered with a sheet part formed in a plane separated from the surface sheet. A supporting frame is installed between the surface sheet and the edges of the sheet part, and the component parts are all bonded fast together by the polyurethane insulation.

14 Claims, 6 Drawing Figures

PROCEDURE FOR MANUFACTURING A BUILDING ELEMENT, AND THE BUILDING ELEMENT

BACKGROUND OF INVENTION

The present invention concerns a procedure for manufacturing a building element such as a door, where the surface sheets of the element are affixed to a frame and between the sheets is placed an insulation.

As a rule the manufacturing of building elements and of doors in particular takes place in that one surface sheet is fastened by gluing and nailing to the frame and in the free space is placed a mineral wool or glass wool mat, whereafter the other surface sheet is glued and nailed fast to the frame. The procedure consists of several work steps, and in order that the element might gain sufficient rigidity, as is required in the case of doors, the frame and the surface sheets have to be of a material sufficiently rigid and thick.

SUMMARY OF INVENTION

The object of the present invention is to eliminate the drawbacks mentioned above. The procedure of the invention is characterized in that the insulation provided between an outer frame and two covering surface sheets consists of polyurethane, which is injected into the space between the surface sheets so that it is glued fast to the sheets and to the frame. By the aid of the invention a rigid, tightly sealed and light weight building element is obtained for which the manufacturing comprises a couple of work steps only: positioning the components of the element in a mould, and injecting polyurethane between the surface sheets where it is foamed and cured to provide the sealing for the sheets and the frame.

A favourable embodiment of the invention is characterized in that in one surface sheet at least are made apertures, and the apertures are covered with sheet parts which are glued fast with polyurethane in a plane different from that of the surface sheet. It is possible by simple additions of such apertures and sheet parts to create an attractive pattern of the building element's surface; such patterns have previously been produced by means of weight-adding dead, i.e. nonstructural components.

Another embodiment of the invention is characterized in that said sheet parts are detached from the apertures in the surface sheet. In this way material is saved and no pieces go to waste.

A third embodiment of the invention is characterized in that a sealing and supporting frame is installed between the edges of the surface sheet apertures and the sheet part. The sealing and supporting frame may be used to fix the distance between the surface sheet and the sheet parts as desired. The supporting frames encircling the sheet parts also contribute to attractive appearance.

One embodiment of the invention is also characterized in that the components of the element are mounted in a mould, whereupon the polyurethane bonding and insulation material is injected between the surface sheets. The element is hereby held in desired configuration and the pressure produced by the foaming polyurethane cannot give rise to any bulges of the element's surface sheets.

One embodiment of the invention is furthermore characterized in that in depressions in the bottom of the mould are first placed sheet parts with their sealing and supporting frames, whereafter the surface sheet provided with apertures is placed thereupon so that the sealing and supporting frame lodge in the apertures of the surface sheet, the frame of the element being next placed upon the surface sheet and upon the frame being placed the other surface sheet and the mould being closed wiht a cover. The placing of the components in the mould is a swift and easy operation. As soon as the polyurethane injected into the interspace between the sheets and frames of the element in the mould has foamed and cured, the element taken out of the mould is ready for finishing, such as varnishing for instance.

The invention also concerns a building element produced by carrying out the procedure. The building element of the invention is characterized in that the insulation consists of polyurethane which has been injected between an outer frame and two surface sheets so that it sticks, or becomes glued, fast to the sheets and to the frame. This element will have a very high rigidity. The surface sheets and frame structure may be made of considerably thinner materials than was possible in prior art. The polyurethane expands to fill all gaps and it sticks, and no gaps or cracks can be formed. When used as a door, the element is so light that the hinges and their fixing may be simpler compared with hinges and hinge mountings of prior art doors. The thermal conductivity k value of an element of this kind is less than 0.4, indicating that it has insulating snd thermal lagging properties considerably superior to elements known in the art.

One embodiment of the invention is characterized in that at least one surface sheet presents apertures and sheet parts covering the apertures, and that the sheet parts have been glued fast by polyurethane in a plane separate from the sheet proper. In this way an attractive pattern is obtained e.g. on a door leaf, the kind of which has previously been produced by the aid of weight-adding dead or nonstructural components, these being fixed onto the surface sheet.

One embodiment of the invention is furthermore characterized in that the sheet parts have been detached or provided from the apertures in the surface sheet. In this way the material consumption is economized and no waste is incurred.

One embodiment of the invention is characterized in that the surface sheet comprises ornamental sheet parts which have been partly pressed out from the surface sheet, so that they remain connected with the frame sheet at the broken edge. This is a way in which the ornamental sheet part is even originally made to take its proper place, simply and rapidly, whereafter ornamental strips or laths may be glued on the edges. When furthermore polyurethane is injected into the door, it cannot flow out through the gaps between ornamental sheet parts.

One embodiment of the invention is furthermore characterized in that there is a sealing and supporting frame between the edges of the surface sheet and the sheet part. The sealing and supporting frame can be applied to fix the spacing of the surface sheet and sheet parts as desired. It is also noted that the frames encircling the sheet part afford an attractive appearance.

DESCRIPTION OF INVENTION

The invention is described in the following with the aid of an example and with reference to the attached drawings, wherein:

FIG. 1 presents a perspective view of the components of a door to be manufactured by the completed procedure of the invention.

Figure 1:
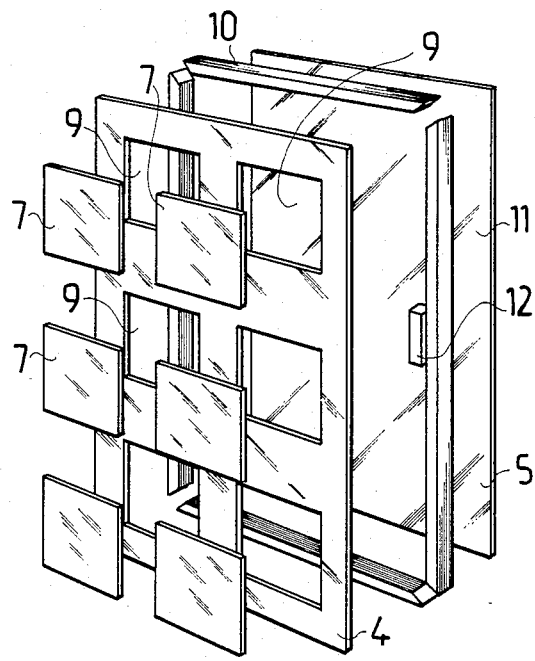
Figure 2:
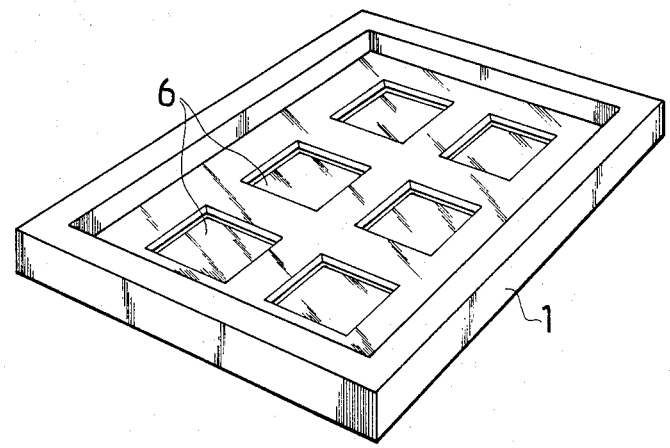
FIG. 2 shows the lower part of the mould.
Figure 3:
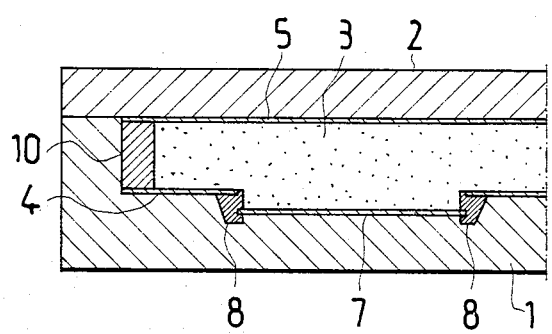
FIG. 3 shows, in sectional view, parts of the door in the mould.
Figure 4:
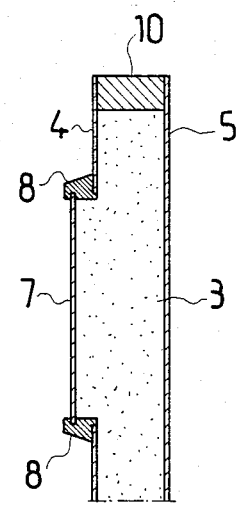
FIG. 4 shows part of the door, in sectional view.

In the procedure of the invention, the component parts going to make up the building element such as a door are placed in the mould 1 and closed with a cover 2, whereupon the sealing and gluing polyurethane insulation 3 is injected into the space between the surface sheets 4,5. More specifically, in the depressions 6 in the bottom of the mould 1 are placed sheet components 7 with their sealing and supporting frames 8. Thereafter, the surface sheet 9 provided with apertures 4 is placed thereupon in such manner that the sealing and supporting frames 8 come into register with the apertures of the surface sheet 4 and enter these apertures. Next, the frame components 10,11 of the door and the reinforcing block 12 for the lock are placed upon the surface sheet 4. Upon the frame 10,11 is laid another surface sheet 5, and the mould is closed with cover 2. The polyurethane filling 3 is injected through an aperture provided at a suitable point, into the interspace of the sheets 4,5 (not depicted). After the polyurethane has foamed and cured and is thereby glued fast to the sheets and to the frame, the door is taken out from the mould and is ready for finishing treatments such as varnishing, and mounting of hinges and lock.

Figure 5:
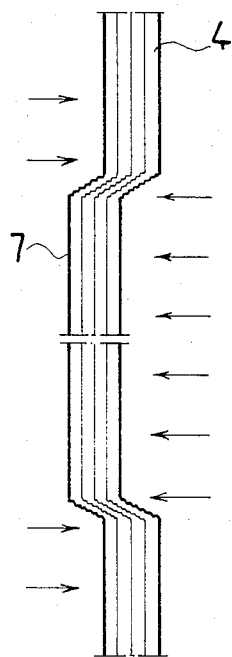
FIG. 5 illustrates, in sectional view, the pressing out of an ornamental part in another embodiment of the invention.
Figure 6:
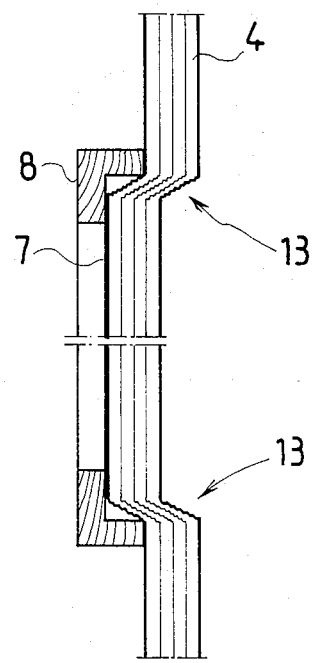
FIG. 6 shows the same view as FIG. 5, with an ornamental strip glued over the edges of the pressed out ornamental sheet part.

As taught by the embodiment of FIGS. 5 and 6, the surface sheet 4 consists of a frame sheet and of ornamental sheet 4 parts 7 pressed and moved out of this sheet 4 into another plane. The ornamental sheet parts 7 have been partly pressed out from the frame sheet 4 so that they remain connected with the frame sheet at the broken edges 13.

The planar surface sheet 4 is inserted in a press where all ornamental sheet parts 7 are embossed, as indicated by arrows in FIG. 5, driving them partly out of the sheet 4, whereby they remain connected at the broken edge 13. The ornamental sheet parts 7 are even initially produced, and remain, in proper position, whereafter the ornamental strips 8 are applied and glued around the edges 13.

It is obvious to a person skilled in the art that different embodiments of the invention may vary within the scope of the claims presented hereinbelow.

We claim:

1. A procedure for manufacturing a light weight and rigid building element, wherein at least two surface sheets of the element are affixed to opposite sides of a frame, apertures are made in at least one of said surface sheets, and the apertures are each covered with a sheet part, and an insulation bonding and sealing material is placed between the sheets, sheet parts, and the frame, said insulation consisting of polyurethane which is injected into the interspace between the surface sheets and the frame in such a manner that the insulation fills all the space and becomes glued fast to the sheets and to the frame, thereby providing a light weight and rigid building element.

2. A manufacturing procedure according to claim 1, wherein the sheet parts are detached from the apertures in the surface sheet.

3. A manufacturing procedure according to claim 1, wherein between edges of the surface sheet aperture and edges of the sheet part is installed a sealing and supporting frame.

4. A manufacturing procedure according to claim 1, wherein the components of the building element are placed in a mould, whereafter the mould is closed and said polyurethane is injected into the interspace between the surface sheets and the frame.

5. A manufacturing procedure according to claim 4, wherein in at least one depression in the bottom of the mould is first placed at least one sheet part together with a sealing and supporting frame, next the surface sheet provided with at least one aperture is placed upon said supporting frame so that the sealing and supporting frame becomes positioned around the aperture of the surface sheet, whereafter the frame component of the building element is placed upon the surface sheet, and upon the frame is placed the other surface sheet and the mould is closed with a cover, after which the insulation is injected into the interspace between the surface sheets and the frame so that the insulation bonds and seals the sheet parts, surface sheets and frames together to make a rigid unitary building element.

6. A light weight sealed and structurally rigid building element, comprising:
   an outer frame component;
   two surface sheets affixed and sealed to opposite sides of said frame, at least one of said surface sheets having apertures therein and a sheet part and frame covering each aperture in a plane separate from said surface sheet; and
   an insulation material located between said sheets and sheet parts, said insulation consisting of polyurethane which has been injected into the interspace between the frame, and the surface sheets and sheet parts to fill all the space therebetween, and foamed and cured so that said polyurethane insulation is glued fast and sealed to said frame and to the sheets and the sheet parts to provide the sole fixing and sealing means for making a sealed and rigid element.

7. A building element according to claim 6, wherein the sheet parts have been detached from the apertures of the surface sheet.

8. A building element according to claim 6, wherein the surface sheet comprises ornamental sheet parts which have been partly pressed out from the surface sheet, so that they remain connected with the surface sheet at the broken edges.

9. A building element according to claim 6, wherein between the edges of the surface sheet and the sheet part there is provided a sealing and supporting frame.

10. A procedure for manufacturing a building element according to claim 5, wherein said element is removed from the mould and given finishing treatments.

11. A procedure for manufacturing a light weight and rigid building element, comprising:

(a) providing a mould having at least one depression therein and placing a sheet part in each depression in said mould;
(b) placing a supporting frame around each sheet part;
(c) placing a first surface sheet into said mould, said surface sheet having at least one aperture therein located in alignment with said supporting frame;
(d) placing a frame component onto said surface sheet within said mould;
(e) placing a second surface sheet over said frame, leaving an interspace between said sheet parts, said surface sheets and said frame;
(f) closing said mould with a cover; and
(g) injecting polyurethane into said interspace, foaming and curing the polyurethane within the closed mould and thereby glueing the sheet parts, the surface sheets to the frame together with the polyurethane to produce a rigid building element.

12. A building element according to claim 6, wherein the thermal conductivity "k" value is less than about 0.4.

13. A building element according to claim 6, wherein said element is a door.

14. A light weight sealed and rigid building element, comprising:
(a) an outer frame component;
(b) two surface sheets affixed and sealed to opposite sides of said frame, one of said sheets having apertures therein with each aperture covered by a sheet part, thereby providing an interspace between said frame and the sheets; and
(c) insulation material located in said interspace, said insulation consisting of polyurethane which has been injected into said interspace under pressure, to fill all gaps, whereby said polyurethane is glued fast and sealed to said frame and to said surface sheets; and thereby providing a sealed and rigid building element.

* * * * *